United States Patent
Davis et al.

(10) Patent No.: US 7,184,751 B1
(45) Date of Patent: Feb. 27, 2007

(54) SYSTEM FOR DETECTING, TRACKING, AND TRANSLATING CHANGING IDENTIFICATION CODES

(76) Inventors: Samuel D. Davis, 790 Bramlett Shoals Rd., Lawrenceville, GA (US) 30045; Reiner J. Gerdes, 812 Oakdale Rd., Atlanta, GA (US) 30307; Fred Stearns, 577 Delphinium Blvd., Acworth, GA (US) 30102; Mark E. Johnson, 5048 Seabrook Pl., Stone Mountain, GA (US) 30087

( * ) Notice: Subject to any disclaimer, the term of this patent is extended or adjusted under 35 U.S.C. 154(b) by 255 days.

(21) Appl. No.: 10/820,498

(22) Filed: Apr. 7, 2004

Related U.S. Application Data

(60) Provisional application No. 60/499,237, filed on Aug. 29, 2003.

(51) Int. Cl.
*H04M 1/66* (2006.01)
(52) U.S. Cl. .................. 455/410; 455/411; 340/825.22
(58) Field of Classification Search ................ 455/403, 455/420, 422.1, 550.1, 426.1, 410, 411; 340/3.1, 5.2, 286.01, 531, 506, 533, 539, 340/825, 870.01, 825.22, 825.36, 825.69; 607/32, 27, 30; 128/903; 600/509; 700/231, 700/241, 236, 244; 379/106.03; 713/176; 709/223, 228; 705/63, 400, 401, 412, 17
See application file for complete search history.

(56) References Cited

U.S. PATENT DOCUMENTS

| | | | |
|---|---|---|---|
| 4,748,668 A | 5/1988 | Shamir et al. ................ 380/30 |
| 4,856,047 A * | 8/1989 | Saunders ................... 340/7.55 |
| 4,995,082 A | 2/1991 | Schnorr ........................ 380/23 |
| 5,140,634 A | 8/1992 | Guillou et al. ................ 380/23 |
| 5,581,615 A | 12/1996 | Stern ........................... 380/25 |
| 5,600,725 A | 2/1997 | Rueppel et al. ............... 380/30 |
| 5,852,409 A * | 12/1998 | Bell ....................... 340/870.02 |
| 5,889,865 A | 3/1999 | Vanstone et al. ............. 380/25 |
| 6,038,491 A * | 3/2000 | McGarry et al. ........... 700/231 |
| 6,134,441 A * | 10/2000 | Astrom et al. .............. 455/445 |
| 6,445,291 B2 * | 9/2002 | Addy et al. ............ 340/539.22 |
| 6,466,138 B1 * | 10/2002 | Partyka ................. 340/870.11 |
| 6,529,883 B1 * | 3/2003 | Yee et al. ..................... 705/63 |
| 6,559,766 B2 | 5/2003 | Mohri ........................ 340/521 |
| 6,570,507 B1 * | 5/2003 | Lee et al. ............. 340/825.22 |
| 6,601,093 B1 * | 7/2003 | Peters ........................ 709/220 |
| 6,629,138 B1 | 9/2003 | Lambert et al. ............ 709/224 |
| 6,714,534 B1 | 3/2004 | Gersberg et al. ............ 370/352 |
| 7,053,767 B2 * | 5/2006 | Petite et al. ................ 340/531 |
| 2002/0067284 A1 * | 6/2002 | Chamberlain et al. . 340/870.02 |
| 2002/0078198 A1 | 6/2002 | Buchbinder et al |
| 2002/0083172 A1 | 6/2002 | Knowles et al. |
| 2002/0097150 A1 * | 7/2002 | Sandelman et al. ......... 340/506 |
| 2002/0105939 A1 * | 8/2002 | Vassilovski et al. ........ 370/349 |
| 2002/0155832 A1 * | 10/2002 | Stucky et al. ............... 455/426 |
| 2003/0041155 A1 | 2/2003 | Nelson et al. |
| 2003/0061488 A1 * | 3/2003 | Huebler et al. ............. 713/176 |

(Continued)

*Primary Examiner*—Jean Gelin
(74) *Attorney, Agent, or Firm*—Harold L. Marquis; George M. Thomas; Scott A. Horstemeyer

(57) ABSTRACT

Disclosed herein are systems, apparatus and methods for (1) detecting codes assigned to utility meters that have frequently changing codes and (2) translating codes between the central data acquisition system that contains a fixed identification code for each utility meter and utility meters that have frequently changing identification codes.

38 Claims, 7 Drawing Sheets

U.S. PATENT DOCUMENTS

2003/0110269 A1* 6/2003 Chen .................... 709/228
2004/0024717 A1  2/2004 Sneeringer
2004/0077347 A1* 4/2004 Lauber et al. .............. 455/428

* cited by examiner

SYSTEM FOR DETECTING, TRACKING, AND TRANSLATING CHANGING IDENTIFICATION CODES

CROSS REFERECE TO RELATED APPLICATION

This application claims priority to copending U.S. provisional application entitled, "SYSTEM FOR DETECTING, TRACKING, AND TRANSLATING CHANGING IDENTIFICATION CODES," having Ser. No. 60/499,237, filed Aug. 29, 2003, which is entirely incorporated herein by reference.

FIELD OF THE DISCLOSURE

The present disclosure invention is generally related to detecting changing identification codes of a remote telemetry device and translating a first code into a second code for communication between a central data acquisition system and a remote data collection device. The system, apparatus, and method further enables the central data acquisition system to communicate with the remote data collection device by translating an identification code of the central data acquisition system into a second identification code of a remote telemetry device. More particularly, the remote telemetry device detects the change of its identification code due to limited availability of codes on the cellular carrier or service providers' networks.

BACKGROUND

Currently, the utility industry has systems to access data from utility meters through a cellular carrier network facility, mobile switching center and a local area network (LAN). The system may further include a central data acquisition system that connects to utility meters via a modem or an Ethernet connection to the local area network (LAN).

Typically, the cellular carrier assigns an identification code, e.g., Internet Protocol (IP) address, a mobile identification number (MIN), and a mobile phone number, to a remote telemetry device coupled to the utility meter. Each utility meter is assigned an identification code for the central data acquisition system to identify and communicate with the utility meter. For example, the central data acquisition system can use a telephone number or a fixed virtual IP address to communicate with the meters, via a modem or LAN connection.

Typically, once the central data acquisition system is programmed with the identification for the utility meter, the identification code essentially remains unchanged or fixed in the central data acquisition system. Currently, the central data acquisition system could only communicate with the utility meters if the utility meter has the same fixed identification code of the central data acquisition system. However, the cellular carrier frequently changes the identification code of the utility meter because, for example, of security reasons or to optimize limited identification codes, such as IP addresses and identification numbers.

From the above, it can be appreciated that it would be desirable to have a system, apparatus, and method that detects and tracks the identification codes assigned to a utility meter that are frequently changed by a cellular carrier. It would also be desirable to have a system, apparatus, and method that translates identification codes to and from the central data acquisition system that contains a fixed identification code for identifying and communicating with utility meters that have frequently changing identification codes.

SUMMARY

Embodiments of the present invention provide a system, apparatus and method for (1) detecting codes assigned to utility meters that have frequently changing codes and (2) translating codes between the central data acquisition system that contains a fixed identification code for each utility meter and utility meters that have a frequently changing identification code.

In one embodiment, the system includes at least one remote data collection device, a central data acquisition system, and an access translation device. The remote data collection device is coupled to a remote telemetry device that facilitates communication between the central data acquisition system and the remote data collection device. The central data acquisition system contains a first identification code that is associated with a remote telemetry device for the central data acquisition system to identify and communicate with the remote data collection device. The remote telemetry device may be assigned a second identification code by, for example, its cellular carrier. However, the second identification code of the remote telemetry device is frequently changed due to, for example, the limited number of second identification codes available. An access translation device is coupled to the central data acquisition system and receives the first identification code from the central data acquisition system. An access translation device also receives the second identification code from the remote telemetry device. The access translation device then translates the first identification code into the second identification code (or translates the second identification code into the first identification code) to facilitate communication between the remote data collection device and the central data acquisition system.

When the remote telemetry device detects that the cellular carrier has changed its second identification code to a new second identification code, the remote telemetry device transmits its new second identification code to the access translation device. The access translation device associates the new second identification code with the remote telemetry device to facilitate communication between the central data acquisition system and the remote data collection device even when the second identification code of the remote telemetry device is frequently changed. The remote telemetry device may also transmit the current second identification code to the access translation device for the access translation device to associate the current identification code with the remote telemetry device.

In one embodiment, a remote telemetry device comprises a transceiver that receives a second identification code, which is frequently changed to a new second identification code. The transceiver is coupled to a processing device that detects when the second identification code is changed to the new second identification code. The transceiver is further capable of transmitting the current or new second identification code via a cellular network, preferably to an access translation device. When the access translation device receives the current or new second identification code from the remote telemetry device, the access translation device associates the current or new second identification code with the remote telemetry device. The access translation device further translates the second identification code into the first identification code and transmits the data to the central data acquisition system. Conversely, when the access translation device receives data from the central data acquisition system, the access translation device translates the first identification code into the second identification code and transmits the data to the remote telemetry device.

In another embodiment, the access translation device has at least one port that receives a first identification code from a central data acquisition system and a second identification code from a remote telemetry device. The access translation device further includes a processing device that translates the first identification code of the central data acquisition system into the second identification code of the remote telemetry device (or translates second identification code into the first identification code) to facilitate communication between the central data acquisition system and the remote data collection device, wherein both the central data acquisition system and remote telemetry device contain a first identification code and a second identification code, respectively, for each other.

In another embodiment, a method is provided for facilitating communication between a central data acquisition system that contains a first identification code and a remote telemetry device that contains a second identification code. The method comprises receiving a second identification code by a remote telemetry device and detecting whether the second identification code has been changed by the cellular carrier. The method further comprises transmitting the current or new second identification code to an access translation device so that the access translation device can associate the second identification code for each remote telemetry device. The access translation device can also translate the first identification code of the central data acquisition system into the second identification code of the remote telemetry device (or translates second identification code into the first identification code) to facilitate communication between the central data acquisition system and the remote data collection device.

In another embodiment, a method is provided for facilitating communication between a central data acquisition system that contains a first identification code and a remote telemetry device that contains a second identification code. The method may comprise receiving the first identification code from the central data acquisition system and the second identification code from the remote telemetry device. The method further comprises associating the first identification code with the second identification code and translating the first identification code into the second identification code, and vice versa. The translation of identification codes enables the central data acquisition system to communicate with the remote data collection device.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present disclosure enables a central data acquisition system that uses a first code to communicate with a remote data collection device coupled to a remote telemetry device that uses a second code. In particular, disclosed is a system, apparatus, and method that provides for translating codes of the central data acquisition system and the remote telemetry device to facilitate communication between the central data acquisition system and remote data collection device. The system, apparatus, and method enables the remote telemetry device to detect the change of its identification code, which is frequently changed, due to the limited availability of codes on a cellular carrier or service providers. Further, the remote telemetry device detects a current or new second identification code from the cellular carrier and transmits the current or new second identification code via a cellular network, preferably to an access translation device. The access translation device tracks the second identification code and translates a first identification code of the central data acquisition system into the second identification of the remote telemetry device, and vice versa.

Example systems are first discussed with reference to the figures. Although these systems are described in detail, they are provided for purposes of illustration only and various modifications are feasible. After the example systems have been described, exemplary block diagrams of the access translation device and the remote telemetry device are provided to explain the components that may be involved to operate the access translation device and the remote telemetry device. After the exemplary block diagrams of the access translation device and the remote telemetry device have been described, examples of operations are provided to explain the manner in which the access translation device and the remote telemetry device operate.

Figure 1:
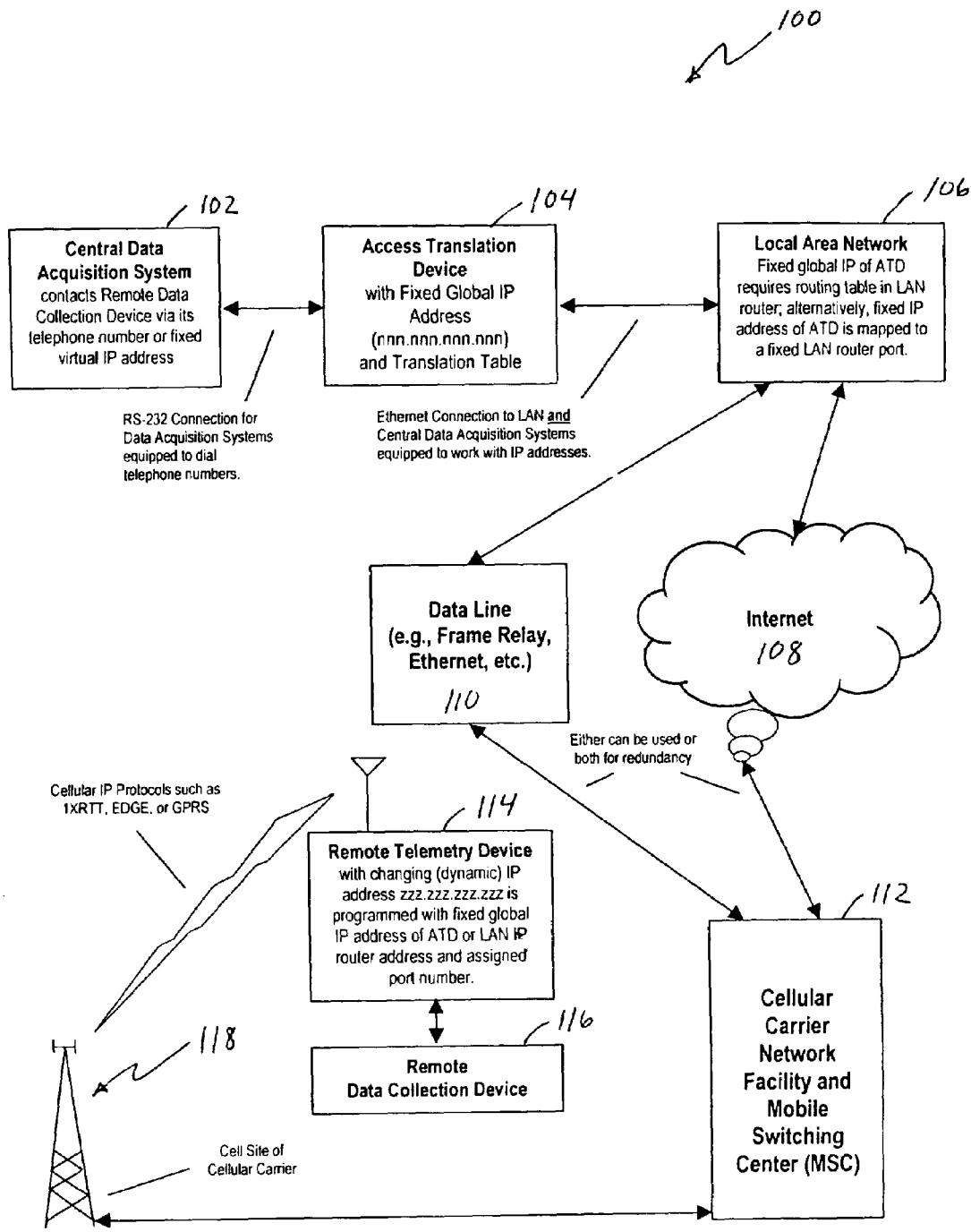
FIG. 1 is an exemplary schematic view of an embodiment of a telemetry data communication system to provide communication between a central data acquisition system and a remote data collection device.

FIG. 1 is a schematic view of an embodiment of a telemetry data communication system that enables communication between a central data acquisition system and a remote data collection device. Referring to FIG. 1, the telemetry communication system 100 may include a central data acquisition system 102, an access translation device 104, a local area network 106, a data line 110, an Internet 108, a cellular carrier network facility and mobile switching center (MSC) 112, a cellular tower 118, a remote telemetry device 114, and a remote data collection device 116. The remote telemetry device 114 is coupled to the remote data collection device 116, either as a single unit or two separate units. The remote telemetry device 114 transmits and receives data from and to the remote data collection device 116. The central data acquisition system 102 can communicate with the remote data collection device 116 via the local area network 106, cellular carrier 112, data line 110 and cellular tower 118.

Typically, the cellular carrier 112 assigns an IP address, a mobile identification number (MIN), and a mobile phone number to the remote telemetry device 114 coupled to the remote data collection device 116. The IP address, MIN, and mobile phone assigned by the cellular carrier 112 to the remote telemetry device 114 are referred to as the second identification code. The central data acquisition system 102 can be programmed with the IP address and the mobile phone number to identify and enable communication with the remote data collection device 116. The IP address and the mobile phone number can be programmed into the central data acquisition system 102 and are referred to as the first identification code.

Once the first identification code is programmed into the central data acquisition system 102, it can be fixed. On the other hand, the second identification code assigned to the remote telemetry device 114 by the cellular carrier 112 can frequently change because, for example, of security reasons or to optimize limited IP addresses and identification numbers.

The access translation device 104 is coupled to the central data acquisition system 102 by a serial port, a serial port using modem AT command set protocol, or LAN connection. The central data acquisition system 102 can dial to the access translation device 104 using the mobile phone number programmed in the central data acquisition system. In another example, the central data acquisition system 102 can communicate to the access translation device 104 using the IP address programmed in the central data acquisition via the LAN connection. In both alternatives, the central data acquisition system 102 uses the first identification code (e.g., IP address, and a mobile phone number) to establish communication with the remote data collection device 116 through the access translation device 104.

The remote data collection device 116 communicates with the central data acquisition system 102 via the remote telemetry device 114, cellular tower 118, cellular carrier network facility and mobile switching center 112, local area network 106, and access translation device 104. The remote telemetry device 114 uses a translation identification code to communicate with the access translation device 104. More particularly, the translation identification code allows the remote telemetry device 114 to identify and communicate with the access translation device 104 instead of other devices connected to the local area network 106, the Internet 108, or the data line 110. In other words, the translation identification code is similar to that of a home address or an IP address of a website on the Internet. For example, the translation identification code may include a fixed global IP address. The remote telemetry device 114 connects to the cellular network and locates the access translation device 104 from the Internet 108 using the fixed global IP address.

The remote telemetry device 114 can also locate and establish communication with the access translation device 104 using a LAN IP router fixed global IP address and the assigned port number of the local area network (LAN) 106 (referred as LAN identification code). The remote telemetry device 114 connects to the cellular network and locates the access translation device from the Internet using LAN identification code. The LAN 106 routes the LAN identification code to the translation identification code enabling the remote telemetry device 114 to establish communication with the access translation device 104. The LAN 106 can include a routing table to perform the routing of the codes.

As briefly mentioned above, the cellular carrier 112 assigns a second identification code (e.g., IP address, a mobile identification number (MIN), and mobile phone number) to the remote telemetry device 114 coupled to the remote data collection device 116. The second identification code enables the remote telemetry device 114 to establish communication with the access translation device 104. The second identification code of the remote telemetry device 114 enables the access translation device 104 to locate the remote telemetry device 114 in the cellular network and establish communication with the remote telemetry device 114, which in turn can communicate to the remote data collection device 116. Because the cellular carrier has a limited number of second identification codes, the second identification code can frequently change to allow the cellular carrier to communicate with more remote telemetry devices 114 coupled to the remote data collection devices 116 than the actual numbers of the second identification codes contained in the cellular carrier 112. The remote telemetry device 114 can detect whether the second identification code is changed by the cellular carrier 112 and transmit the new second identification code to the access translation device 104 that tracks the new second identification code with the remote telemetry device 114.

When the remote telemetry device 114 communicates to the access translation device 104, the remote telemetry device 114 locates the access translation device using the translation identification code or the LAN identification code to establish communication with the access translation device 104. The remote telemetry device 114 can send the current or new second identification code to the access translation device 104 for the access translation device 104 to track the current or new second identification code of the remote telemetry device 114. For example, the remote telemetry device sends the current or new second identification code that may include the mobile identification code (MIN) and the current or new IP address. The access translation device 104 matches the MIN in its database and associates the current or new IP address to the MIN in its database. The MIN allows the access translation device 104 to identify the remote telemetry device 114 even when the IP address has been changed. The access translation device 104 further associates the first identification code with the MIN. Thus, the access translation device 104 can translate the first identification code to the second identification code, or vice versa.

Figure 3:
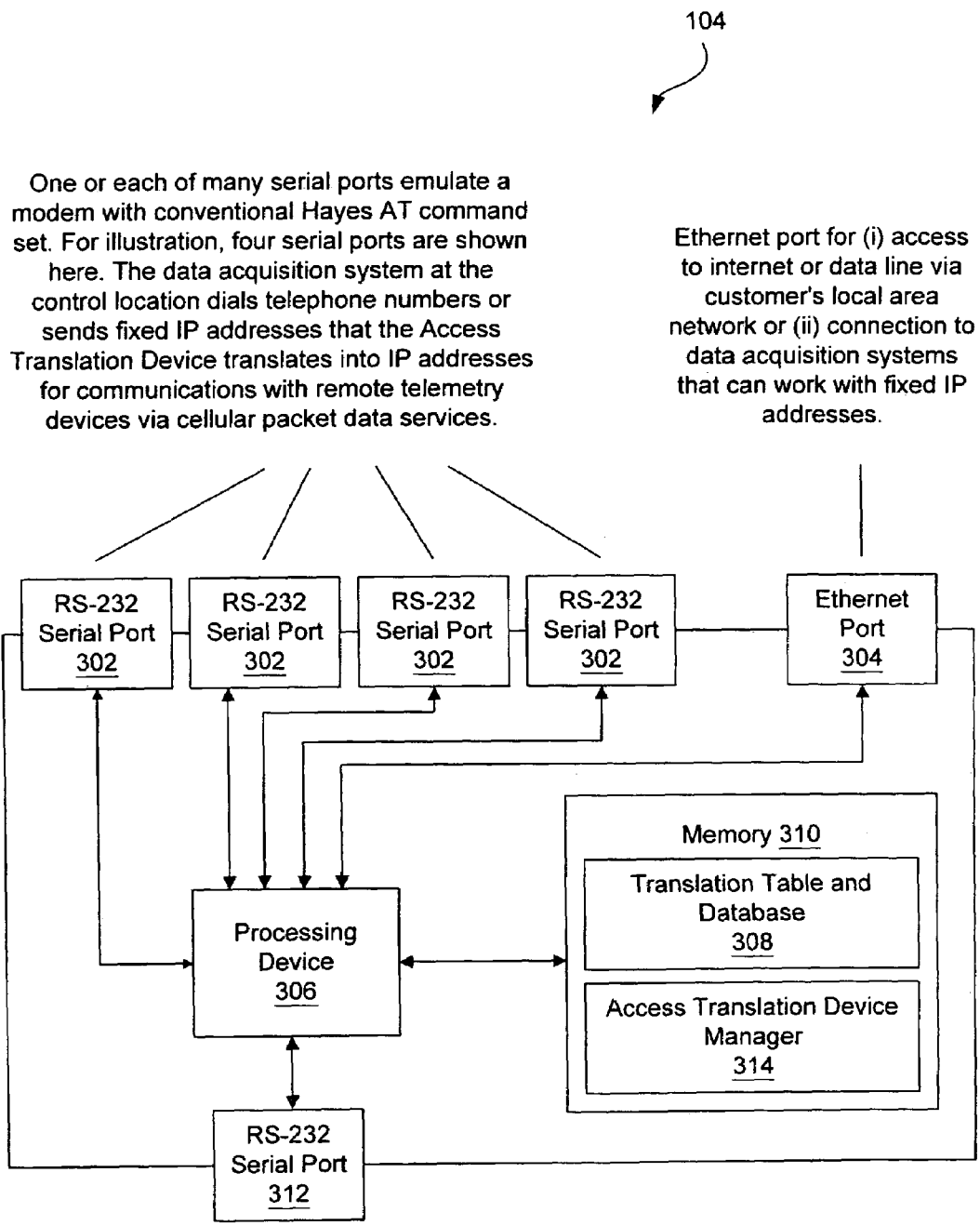
FIG. 3 is an exemplary block diagram of an embodiment of an access translation device of FIGS. 1 and 2.

The access translation device 104 may include a look-up table or translation table (reference numeral 308 in FIG. 3). This enables the access translation device 104 to track the frequently changed second identification code of the remote telemetry device 114 and associate the first identification code of the central data acquisition system 102 to the (current or new) second identification code of the remote telemetry device 114. For example, the look-up table 308 may include the fixed mobile phone number or IP address of the first identification code that is associated with the remote data collection device 116. The look-up table 308 links the fixed mobile phone number or IP address with the MIN code of the second identification code that identifies the remote telemetry device 114. The look-up table 308 further links the fixed mobile phone number or IP address and the MIN code of the second identification code with the current or new IP address of the second identification code, which allows the access translation device 104 to translate the first identification code to the second identification code, or vice versa, and enable the access translation device 104 to locate and establish communication with the remote data collection device 116.

When the remote telemetry device 114 sends the current or new IP address to the access translation device 104 to be updated in the look-up table 308, the remote telemetry device 114 sends the MIN code of the remote telemetry device 114 along with the current or new IP address. The access translation device 104 looks up the MIN code in the look-up table 308 and updates the table 308 with the transmitted IP address linking it to the MIN code and the fixed mobile phone number or IP address.

The look-up table 308 further enables the access translation device 104 to translate the first identification code into the second identification code, and vice versa. For example, when the central data acquisition system 102 communicates data to the remote data collection device 116, the system 102 establishes communication with the access translation device 104 using the first identification code. The access translation device 104 uses the look-up table to locate the second identification code (e.g., dynamic IP address) of the remote telemetry device 114 that is linked with the first identification code. The access translation device 104 establishes communication with the remote telemetry device 114 using the second identification code and sends the data from the central data acquisition 102 to the remote telemetry device 114, which can communicate the data to the remote data collection device 116. Thus, the access translation device 104 facilitates communication between the remote data collection device 116 and the central data acquisition system 102 even when the cellular carrier 112 changes the second identification code of the remote telemetry device 114. FIG. 1 shows that the access translation device 104 can perform its translation for use with any of the cellular packet data services (e.g., 1XRTT/CDMA, EDGE/GSM and GPRS/GSM). The access translation device 104 makes it possible to establish a machine-to-machine wireless packet data transmission pipe from an existing central data acquisition system 102 to each remote data collection device 116.

For central data acquisition systems 102 with IP capability, the access translation device 104 can translate fixed virtual IP addresses (first identification code) assigned in the central data acquisition system 102 into dynamic IP addresses (second identification code) assigned to the remote telemetry device 114 by the cellular carrier 112. For data acquisition systems with modem capability, the access translation device 104 can translate fixed telephone number (first identification code) assigned in the central data acquisition system 102 into dynamic IP addresses (second identification code) assigned to the remote telemetry device 114 by the cellular carrier 112. The remote telemetry device 114 can detect whether the second identification code has been changed by the cellular carrier and send the new second identification code to the access translation device 104. As a result, the central data acquisition system 102 can contact the remote telemetry device 114 at any time that is desired and even after the second identification code of the remote telemetry device 114 has been changed.

Figure 2:
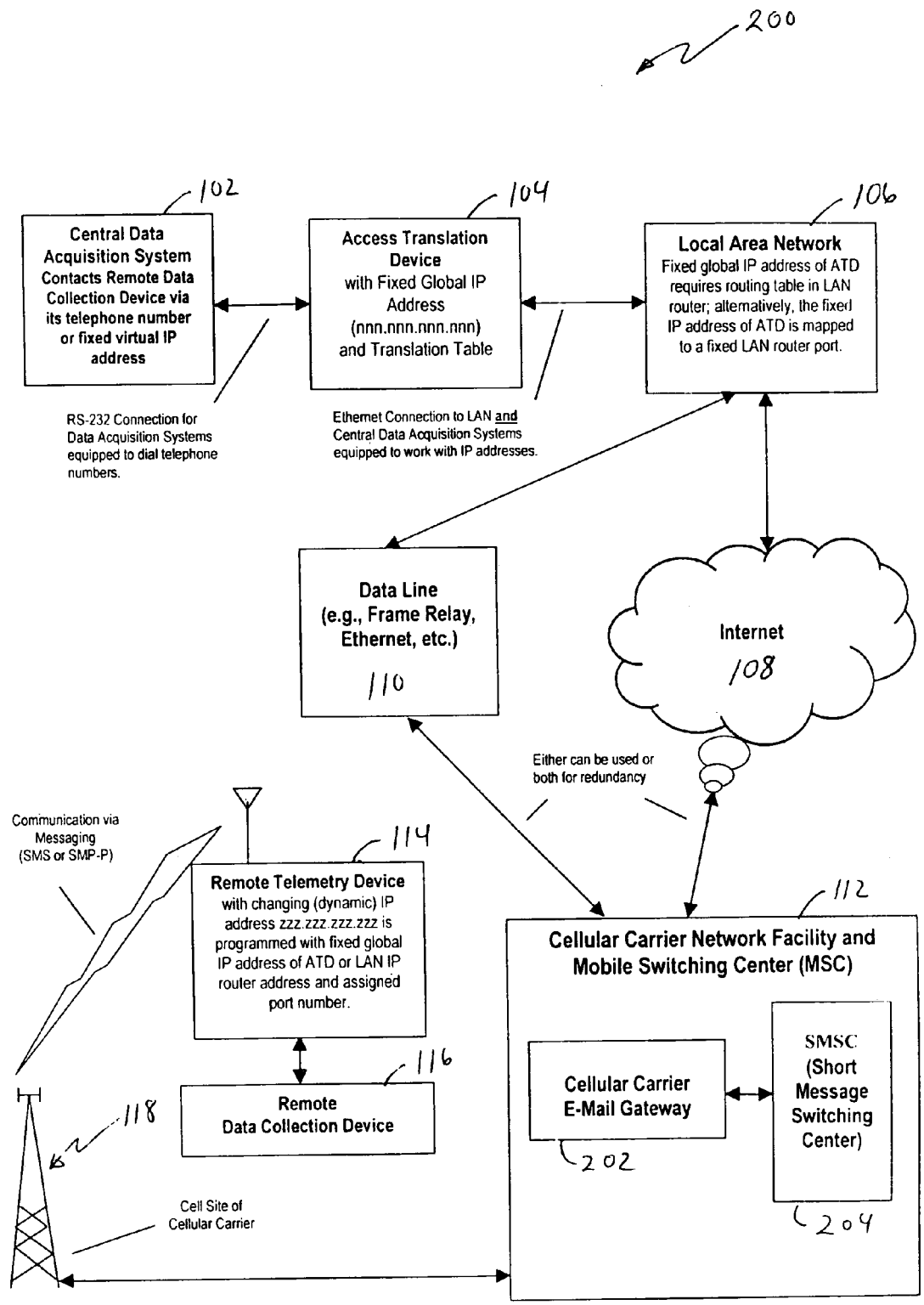
FIG. 2 is an exemplary schematic view of an embodiment of a telemetry data communication system to provide communication between a central data acquisition system and a remote data collection device that uses short messaging.

Referring to FIG. 2, the telemetry digital data communication system 200 essentially includes all of the components of system 100 of FIG. 1 with the addition of a cellular carrier e-mail gateway 202 and a short message switching center (SMSC) 204. The system 200 of FIG. 2 operates essentially the same way as the system 100 of FIG. 1, but uses Short Messaging Service (SMS) or Point-to-Point Messaging Service (SMP-P) to facilitate communication between the central data acquisition system 102 and the remote data collection device 116. It should be noted that the access translation device 104 can perform essentially the same functions, e.g., its translation and tracking features mentioned above, to establish communication between the remote data collection device 116 and the central data acquisition system 102 even when the cellular carrier 112 changes the second identification code of the remote telemetry device 114. The access translation device 104 facilitates a direct connection to the SMSC 204, which is preferred, and also facilitates a connection to the e-mail gateway 202.

FIG. 3 shows an exemplary block diagram of the access translation device 104, which can be connected like any conventional modem to a central data acquisition system 102 for polling any number of remote data collection devices 116, such as meters or data loggers. The access translation device 104 is programmed with a translation device identification code, such as global fixed IP addresses, and can interpret conventional Hayes AT commands. As mentioned above, the translation identification code enables the remote telemetry device 114 to locate the access translation device 104 from the Internet 108 and establish communication with the access translation device 104.

The access translation device 104 may include at least one port, a processing device 306, and memory 310. The port includes at least one RS-232 serial port 302, at least one Ethernet port 304, and preferably at least one setup port 312. The RS-232 port 302 may emulate a modem with conventional Hayes AT command set. The Ethernet port 304 facilitates (i) access to the Internet or data line via LAN or (ii) connection to the central data acquisition system 102. Typically, the cellular carrier 112 assigns the remote telemetry device 114 coupled to the remote data collection device 116 with a second identification code, such as an IP address, which may be dynamic that changes randomly or at predetermined times. The remote telemetry device 114 coupled to the remote data collection device 116 transmits the new second identification code to the access translation device.

The processing device 306 can track the changed second identification code in the translation table 308 by replacing the old second identification code with the new second identification and linking the first identification code of the central data acquisition system 102 with the new second identification code of the remote telemetry device 114. This facilitates host-to-remote communication any time that this is desired. The access translation device 104 is suitable for use with any cellular packet data services such as 1XRTT, EDGE, or GPRS, as shown in FIG. 1, as well as short messaging services (SMS) as shown in FIG. 2.

The memory 310 comprises a translation table and database 308 and an access translation device manager 314. The access translation device manager 314 facilitates the process for (1) tracking the second identification code that the remote telemetry device sends to the access translation device, and (2) translating the first identification code into the second identification code (or vice versa). Typically, the process involves receiving a second identification data from the remote telemetry device 114 via a cellular network and tracks the second identification code with the received second identification code. Further, the process involves translating the first identification code into the second identification code and vice versa, to establish communication between the central data acquisition system 102 and remote data collection device 116. Operation of the access translation device manager 314 is described in relation to FIGS. 5 and 6.

The access translation device 104 can provide one or more central data acquisition systems 102 with access to one or more remote telemetry devices 114 that have limited local transmission control protocol (TCP/IP) support and Internet Protocol (IP) addresses that are dynamically assigned (changed randomly or at predetermined times) by a service provider such as a cellular carrier 112. For example, by providing a means of mapping, either the mobile telephone numbers or the fixed virtual IP addresses of the remote telemetry device 114, the access translation device 104 allows the central data acquisition system 102 to access the remote data collection devices 116 despite the IP address of the remote telemetry device 114 are dynamically assigned.

The access translation device 104 can maintain a translation table and database 308 (FIG. 3) that maps the first identification code assigned in the central data acquisition system 102 configured for the remote data collection device 116 to the second identification code of the remote telemetry device 114. Any time the remote telemetry device 114 establishes a network session with the cellular carrier 112 and is assigned its dynamic IP address, the remote telemetry device 114 can send a user datagram protocol (UDP/IP) to the access translation device 104. This datagram protocol may contain the IP address, a mobile identification number (MIN), and a mobile phone number (second identification code) of the remote telemetry device 114. Preferably, the datagram contains the MIN code and the dynamic IP address. The MIN code of the second identification code identifies the remote telemetry device 114 to the access translation device 104. The dynamic IP address is updated in the access translation device and is linked with the MIN code of the remote telemetry device 114 and the first identification code of the central acquisition system 102 for the remote telemetry device 114. The access translation device 104 uses the dynamic IP address to locate and establish communication with the remote data collection device 116. The remote telemetry device 114 can periodically retransmit the UDP/IP datagram to the access translation device 104 to update the mapping table 308.

The access translation device 104 can translate packets addressed to the cellular telephone number or the fixed virtual IP address (first identification code) of the central data acquisition system 102 into the dynamic IP address (second identification code) that was assigned to the remote telemetry device 114 by the service provider, such as the cellular carrier 112. In this manner, the access translation device 104 facilitates communication between a central data acquisition system 102 that can only handle fixed telephone numbers or IP addresses (first identification code), and remote data collection devices 116 that is coupled to the remote telemetry devices 114, which have frequently changed IP addresses (second identification code).

Figure 4:
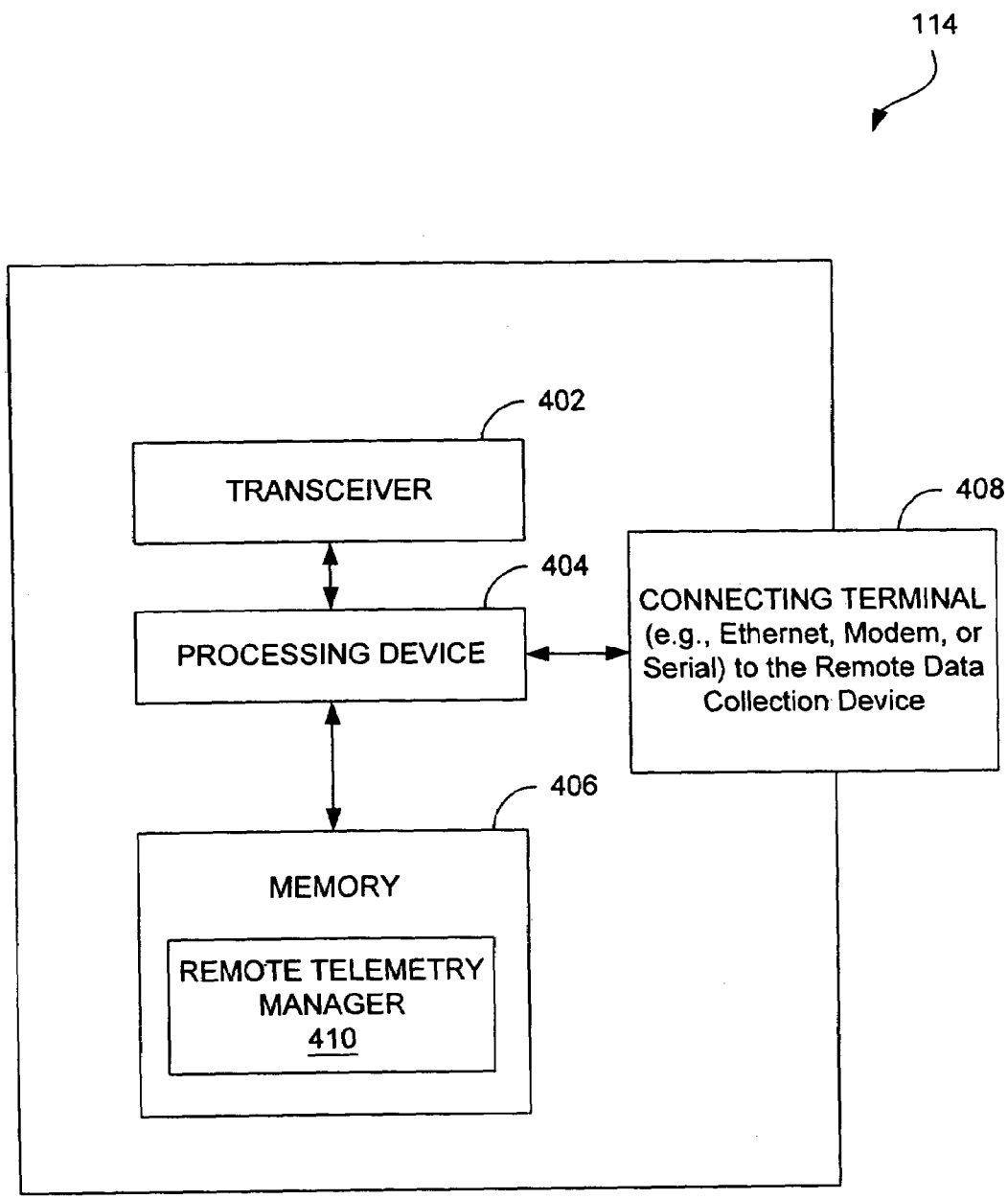
FIG. 4 is an exemplary block diagram of an embodiment of a remote telemetry device of FIGS. 1 and 2.

FIG. 4 is a block diagram of an embodiment of an remote telemetry device of FIGS. 1 and 2. A remote telemetry device 114 comprises a transceiver 402, a processing device 404, memory 406 and a connecting terminal 408. The transceiver 402 receives a second identification code from a cellular carrier 112, which frequently changes the second identification code to a new second identification code. The processing device 404 is coupled to the transceiver 402 and detects the changing second identification code. The processing device 404 can instruct the transceiver 402 to transmit the current or new second identification code via a cellular network to the access translation device 104.

The memory 406 can store the second identification code, a translation device identification code, and a LAN identification code. The second identification code allows the remote telemetry device 114 to identify itself to an access translation device 104 when the remote telemetry device 114 communicates via the cellular network. The remote telemetry device 114 uses the translation identification code and the LAN identification code to locate and communicate with the access translation device 104. The memory 406 includes a remote telemetry manager 410 that facilitates the process for detecting the changing second identification code of the remote telemetry device 114. Typically, the process involves receiving the second identification code via the cellular carrier 112, and transmitting the received second identification code from the cellular carrier via a cellular network. Operation of the remote telemetry manager 410 is described in relation to the FIGS. 5 and 7.

The connecting terminal 408 is coupled to the processing device 404 and a remote data collection device 116. The connecting terminal 408 facilitates communication between the remote data collection device 116 and the remote telemetry device 114. The connecting terminal 408 may include an Ethernet, serial, or modem connection. The processing device 404 receives data from the remote data collection device 116 and instructs the transceiver 402 to send the data to the access translation device 104, which in turn sends the data to the central data acquisition system 102.

Figure 5:
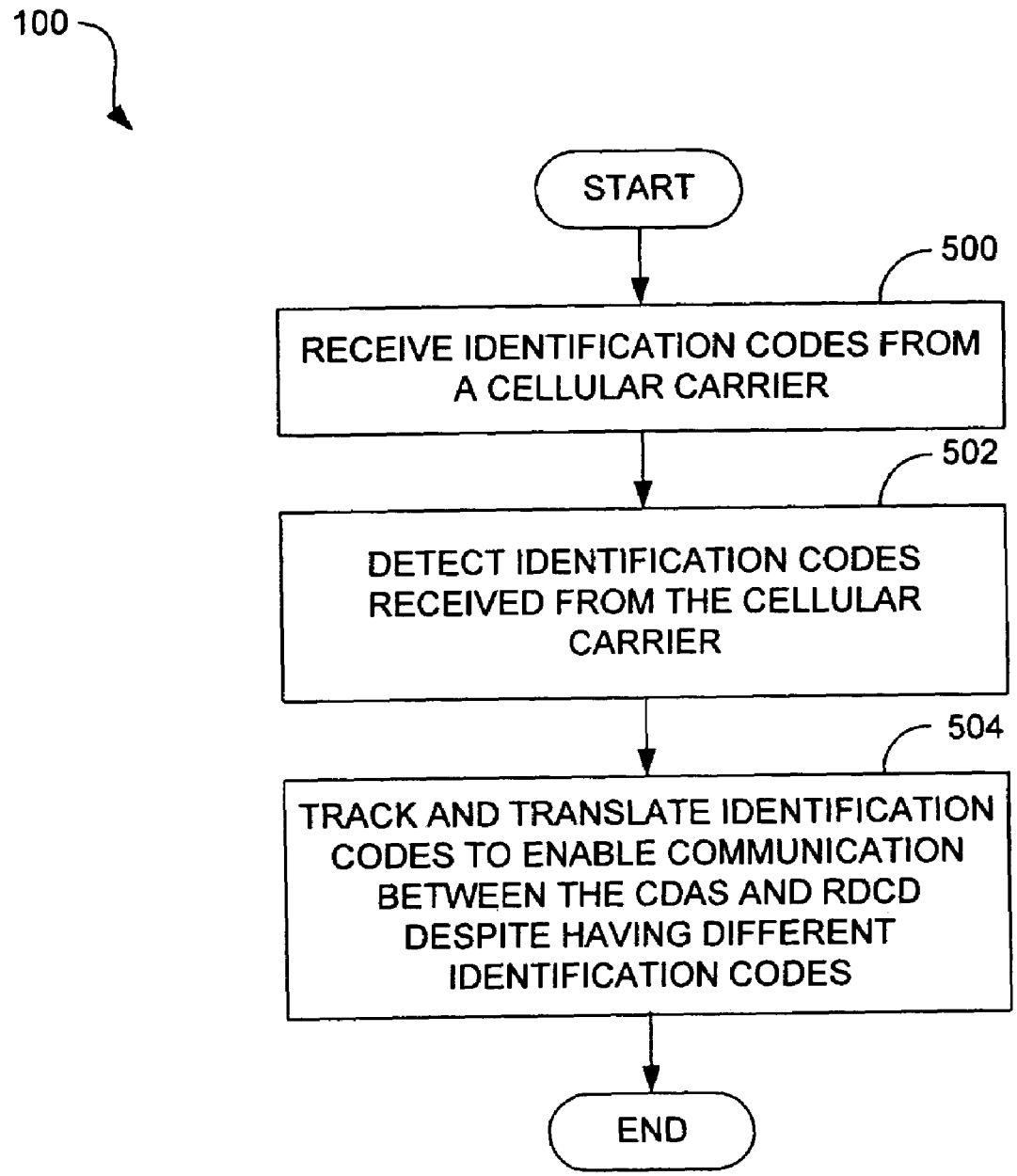
FIG. 5 illustrates a high level example of operation of the system in detecting, tracking, and translating changing identification codes.

FIG. 5 illustrates a high level example of operation of the system in detecting, tracking, and translating changing identification codes. With the system, the central data acquisition system and the remote data collection device can communicate with each other despite having different identification codes. Beginning with block 500, the system receives identification codes from a cellular carrier. In block 504, the system 100 tracks the changing second identification code and translates the identification codes to enable communication between the central data acquisition system 102 and the remote data collection device 116 despite having different identification codes.

Figure 6:
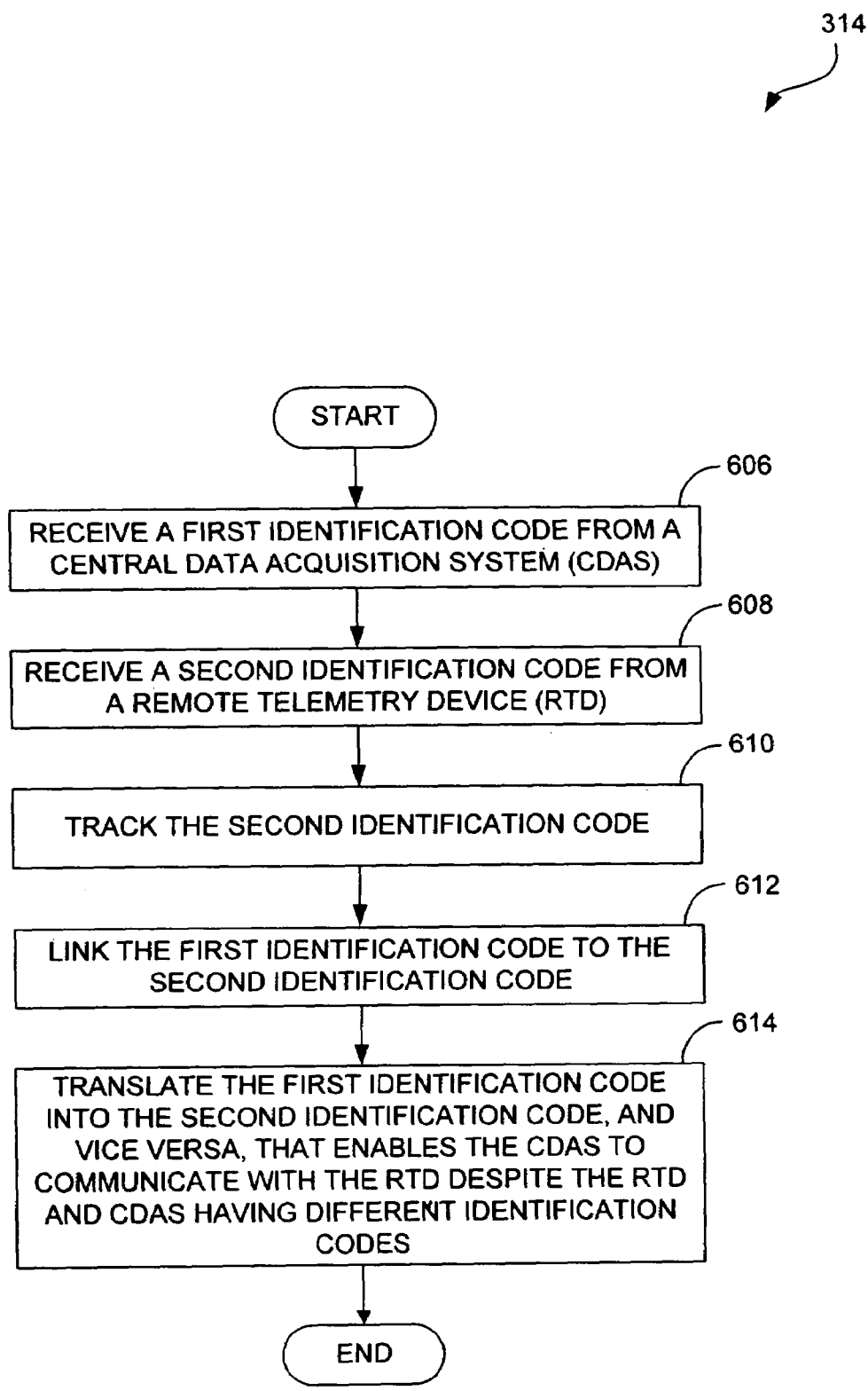
FIG. 6 illustrates an example of operation of an access translation device manager that facilitates the tracking and translating of identification codes received from the central data acquisition system and the remote telemetry device.

FIG. 6 illustrates an example of operation of an access translation device manager 314 that facilitates the tracking and translating of identification codes received from the central data acquisition system and the remote telemetry device. Beginning with block 606, the access translation device receives a first identification code from a central data acquisition system, which is fixed or does not change. In block 608, the access translation device also receives a second identification code from a remote data collection device that is frequently changed by, for example, the cellular carrier 112.

In block 610, the access translation device tracks the second identification code that the remote telemetry device sends to the access translation device. The received second identification code may be a current second identification code or a new second identification code that was changed by the cellular carrier 112 and assigned to the remote telemetry device. In block 612, the access translation device manager 314 can track the received second identification code by associating the first identification code to the received second identification code. The association of the identification codes can be done via a translation table and database (FIG. 3).

In block 614, the access translation device manager 314 translates the first identification code into the second identification code, and vice versa, that enables communication between the central data acquisition system and the remote data collection device despite the central data acquisition system and the remote telemetry device having different identification codes.

Figure 7:
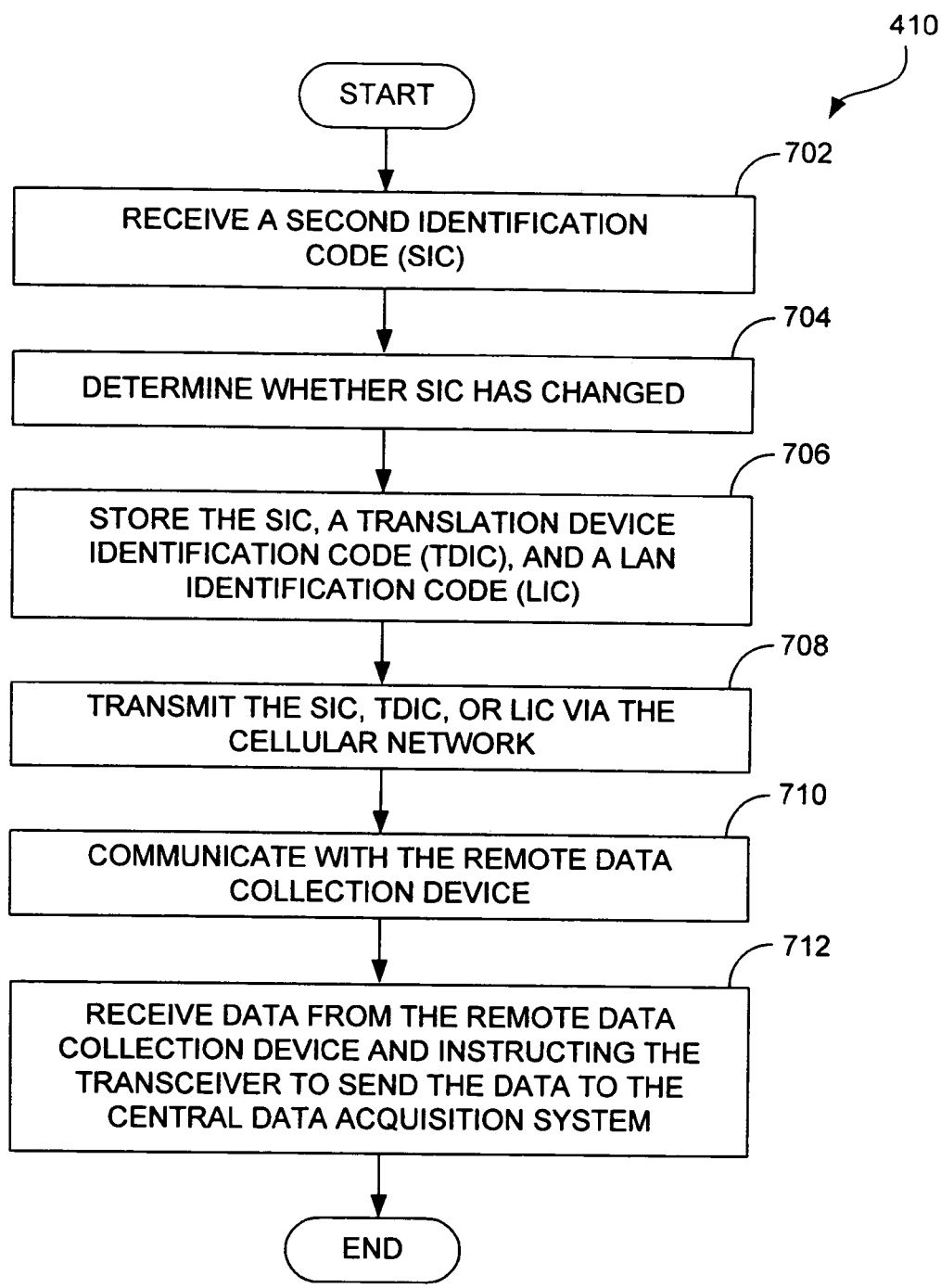
FIG. 7 illustrates an example operation of a remote telemetry manager that facilitates detecting an identification code that is changed by a service provider.

FIG. 7 illustrates an example of operation of a remote telemetry manager 410 that facilitates detecting the second identification code that is changed by the cellular carrier. Beginning with block 702, the remote telemetry manager 410 receives that second identification code from the cellular carrier. In block 704, the remote telemetry manager 410 determines whether the second identification has changed.

In block 706, the remote telemetry manager 410 can store the second identification code, a translation identification code and a LAN identification code. In block 708, the remote telemetry manager 410 may facilitate transmitting the second identification code, translation device identification code, or the LAN identification code via the cellular network. The transmission of these codes enables the remote telemetry device to locate the access translation device 104 and communicates with the access translation device either to update the changed second identification code or establish communication between the central data acquisition system 102 and the remote data collection device.

In block 710, the remote telemetry manager 410 can also facilitate communication between the remote telemetry device and the remote data collection device. The remote data collection device can activate the remote telemetry device to communicate with the central data acquisition system by sending an activation signal. For example, the remote telemetry device may receive data from the remote data collection device, establish communication with the central data acquisition system, and transmit the data to the central data acquisition system 102.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A telemetry digital communication system comprising:
   at least one remote data collection device;
   a central data acquisition system;
   at least one remote telemetry device coupled to at least one remote data collection device, the remote telemetry device being configured for transmitting and receiving digital data between the remote data collection device and the central data acquisition system, wherein the remote telemetry device is assigned a second identification code which can be changed; and
   wherein the central data acquisition system that is assigned a first identification code, the first identification code being associated with the remote data collection device for the central data acquisition system to identify and communicate with the remote data collection device; and
   an access translation device coupled to the central data acquisition system, wherein the access translation device receives the first identification code assigned to the central data acquisition system and the second identification code assigned to the remote telemetry device, the access translation device being configured for translating one of (i) the first identification code into the second identification code and (ii) the second identification code into the first identification code, that enables the access translation device to facilitate communication between the remote data collection device and the central data acquisition system even when the second identification code of the remote telemetry device has changed.

2. The system as defined in claim 1, wherein the access translation device is further configured for tracking a new second identification code received from the remote telemetry device that enables the access translation device to facilitate communication between the central data acquisition system and the remote data collection device.

3. The system as defined in claim 1, further comprising a service provider that is configured for assigning the second identification code to the remote telemetry device, the remote telemetry device being configured for sending the second identification code to the access translation device, which can track the frequently changing second identification codes sent to the remote telemetry device by the service provider.

4. The system as defined in claim 1, wherein the first and second identification codes are each of one of an ID number, phone number, and Internet Protocol (IP) address.

5. The system as defined in claim 1, wherein the first identification code is fixed in the central data acquisition system and is not changed even when the remote telemetry device is assigned with a new second identification code.

6. The system as defined in claim 1, wherein the remote telemetry device is configured for sending a user datagram protocol and Internet protocol (UDP/IP) datagram to the access translation device, the UDP/IP datagram containing the second identification codes, the second identification code including a fixed mobile identification number (MIN/MISDN) and a dynamic IP address, the access translation device being configured for using the UDP/IP datagram to facilitate tracking the frequently changing dynamic IP address in the second identification code.

7. The system as defined in claim 1, wherein the remote telemetry device periodically transmits its current second identification code to the access translation device to update the access translation device.

8. The system as defined in claim 1, wherein the access translation device includes a look-up table that associates the first identification code assigned to the central data acquisition system to the second identification code assigned to the remote telemetry device.

9. The system as defined in claim 1, wherein the system is configured for operating as a cellular packet data service, a short messaging service (SMS), and point-to-point messaging service (SMP-P), the cellular packet data service is one of 1XRTT/CDMA, CDMA2000, EDGE/GSM and GPRS/GSM.

10. The system as defined in claim 1, wherein the access translation device comprises:
    at least one port, the port being configured for receiving and transmitting identification codes of the central data acquisition system and the remote telemetry device; and
    a processing device being configured for tracking changes in the second identification code assigned to the remote telemetry device and translating the first identification code into the second identification code assigned to the remote telemetry device.

11. The system as defined in claim 10, wherein the port is one of at least one serial port and at least one Ethernet port, the serial port being configured for of receiving and transmitting identification codes of the central data acquisition system and the remote telemetry device via a serial port or serial port with AT modem protocol, and the Ethernet port being configured for receiving and transmitting identification codes of the central data acquisition system and the remote telemetry device via a cellular network.

12. The system as defined in claim 3, further comprising a cellular carrier network facility and mobile switching center (MSC).

13. The system as defined in claim 12, wherein the cellular carrier network facility and mobile switching center further comprises a cellular carrier e-mail gateway and short message switching center.

14. The system as defined in claim 1, wherein the access translation device includes a translation identification code, and the remote telemetry device is programmed with the translation identification code to facilitate communication with the access translation device.

15. The system as defined in claim 14, wherein the translation identification code includes a global fixed IP address.

16. The system as defined in claim 15, further comprising a local area network (LAN) that includes a LAN identification code, the LAN identification code being linked to the translation device identification code, the remote telemetry device being programmed with the LAN identification code to facilitate communication with the access translation device.

17. The system as defined in claim 16, wherein the LAN identification code includes a LAN IP address and assigned port numbers.

18. An access translation device comprising:
at least one port, the port being configured for receiving a first identification code from a central data acquisition system and a second identification code from a remote telemetry device; and
a processing device being configured for translating one of (i) the first identification code into the second identification code and (ii) the second identification code into the first identification code that enables the access translation device to facilitate communication between the central data acquisition system that contains the first identification code and a remote data collection device that is coupled to the remote telemetry device that can have changing second identification codes.

19. The device as defined in claim 18, wherein the processing device is configured for tracking the second identification code that the remote telemetry device sends to the access translation device.

20. The device as defined in claim 18, wherein the first identification code is fixed in the central data acquisition system and does not change even when the second identification code of the remote telemetry device changes.

21. The device as defined in claim 18, wherein the first and second identification codes are one of an identification number (ID), phone number, and Internet protocol (IP) address.

22. The device as defined in claim 18, wherein the port is one of at least one serial port and at least one Ethernet port, the serial port being configured for receiving and transmitting identification codes of the central data acquisition system and the remote telemetry device via modem protocol, and the Ethernet port being configured for receiving and transmitting identification codes of the central data acquisition system and the remote data collection device via a cellular network.

23. The device as defined in claim 22, wherein the Ethernet port is configured for receiving a user datagram protocol and Internet protocol (UDP/IP) datagram, the UDP/IP datagram containing the second identification codes, the second identification code includes a mobile identification number and a dynamic IP address, the access translation device being configured for using the UDP/IP datagram to facilitate tracking a changing second identification code.

24. The device as defined in claim 18, further comprising a look-up table that associates the first identification code assigned to the central data acquisition system to the second identification code assigned the remote telemetry device.

25. The device as defined in claim 18, wherein the device is configured for operating as a cellular packet data service, short messaging service (SMS), and a point-to-point messaging service (SMP-P), wherein the cellular packet data service is one of 1XRTT/CDMA, EDGE/GSM and GPRS/GSM.

26. The device as defined in claim 18, wherein the access translation device includes a translation device identification code, the remote telemetry device being programmed with the translation identification code to facilitate communication with the access translation device.

27. The device as defined in claim 26, wherein the translation identification code includes a global fixed IP address.

28. The device as defined in claim 26, wherein the translation identification code is linked to a LAN identification code of a local area network (LAN) to facilitate communication between the remote data collection device and the access translation device.

29. The device as defined in claim 28, wherein the LAN identification code includes a global LAN IP address and assigned port numbers.

30. A method for facilitating communication via an access translation device between a central data acquisition system that is assigned a first identification code and a remote telemetry device that is assigned a second identification code, the method comprising the steps of:
the access translation device receiving the first identification code from the central data acquisition system;
the access translation device receiving the second identification code from the remote telemetry device;
associating the first identification code with the second identification code; and
the access translation device translating one of (i) the first identification code into the second identification code and (ii) the second identification code into the first identification code that enables communication between the central data acquisition system and a remote data collection device despite the fact the central data acquisition system and remote telemetry device have two different identification codes.

31. The method as defined in claim 30, wherein receiving the first identification code for the central data acquisition system further comprises the use of one of a modem protocol and a LAN network.

32. The method as defined in claim 30, wherein receiving the second identification code from the remote data collection device further comprising the use of one of a LAN network, cellular network, and Internet.

33. The method as defined in claim 30, wherein receiving the first identification code and receiving the second identification code comprising receiving one of an ID number, phone number, and IP address for each code.

34. The method as defined in claim 30, further comprising tracking a new second identification code assigned to the remote telemetry device, the remote telemetry device sending the new second identification code to the access translation device, wherein the tracking of the new second identification code enables the access translation device to translate one of (i) the first identification code into the new second identification code and (ii) the second identification code into the new first identification code, such that the central data acquisition system can communicate with the remote data collection device despite the fact that the remote telemetry device has a new second identification code.

35. The method as defined in claim 30, wherein receiving the second identification code from the remote telemetry device further comprising receiving a user datagram protocol and internet protocol (UDP/IP) datagram in which the UDP/IP datagram contains the second identification code to facilitate tracking a frequently changing second identification code of the remote telemetry device.

36. The method as defined in claim 30, wherein associating the first identification code is accomplished with the second identification code in a look-up table.

37. A remote telemetry device comprising:
a transceiver that receives a first assigned identification code and a second assigned identification code, the first assigned identification code being configured for being changed to the second assigned identification code;
a processing device coupled to the transceiver, the processing device being configured for detecting the second assigned identification code, wherein said transceiver transmits the assigned identification code via a cellular network; and
a memory that stores one of the assigned identification code, a translation device identification code, and a LAN identification code, the assigned identification code enabling the remote telemetry device to be identified and to establish communication with an access translation device, the translation identification code or the LAN identification code enabling the remote telemetry device to identify the access translation device and to establish communication with the access translation device.

38. A remote telemetry device comprising:

a transceiver that receives a first assigned identification code and a second assigned identification code, the first assigned identification code being configured for being changed to the second assigned identification code; and a processing device coupled to the transceiver, the processing device being configured for detecting the second assigned identification code, wherein said transceiver transmits the second assigned identification code via a cellular network wherein the transceiver transmits one of the translation identification code, the LAN identification code and the assigned identification code, wherein the translation identification code or the LAN identification code can be used to identify the access translation device to establish communication with the remote telemetry device, wherein the assigned identification code can be used to identify the remote telemetry device to establish communication with the access translation device.

* * * * *